United States Patent
Teng et al.

(10) Patent No.: US 7,185,284 B2
(45) Date of Patent: Feb. 27, 2007

(54) METHOD AND APPARATUS FOR PROVIDING A HYPERLINK INDICATION ON A DISPLAY FOR AN IMAGE IN A WEB PAGE

(75) Inventors: Un Tung Teng, Boynton Beach, FL (US); Sandhya Chandarlapaty, Boynton Beach, FL (US)

(73) Assignee: Motorola, Inc., Schaumburg, IL (US)

( * ) Notice: Subject to any disclaimer, the term of this patent is extended or adjusted under 35 U.S.C. 154(b) by 425 days.

(21) Appl. No.: 10/324,480

(22) Filed: Dec. 20, 2002

(65) Prior Publication Data

US 2004/0119741 A1    Jun. 24, 2004

(51) Int. Cl.
  *G06F 15/00*    (2006.01)
  *G06F 13/00*    (2006.01)
(52) U.S. Cl. .................................. 715/738; 707/102
(58) Field of Classification Search .............. 345/760, 345/826, 864; 715/501.1, 853, 854, 765, 715/760, 826, 864, 840, 737, 738, 739, 749, 715/851; 707/101, 102, 103, 104
  See application file for complete search history.

(56) References Cited

U.S. PATENT DOCUMENTS 6,011,537 A * 1/2000 Slotznick .................... 345/733
6,075,537 A * 6/2000 Adapathya et al. ......... 345/760
6,459,364 B2 * 10/2002 Gupta ....................... 340/407.1
6,564,250 B1 * 5/2003 Nguyen ....................... 709/208
6,616,701 B2 * 9/2003 Doyle ...................... 715/501.1
6,643,824 B1 * 11/2003 Bates et al. ............... 715/501.1
6,670,968 B1 * 12/2003 Schilit et al. ................ 345/760
6,809,749 B1 * 10/2004 Chen et al. .................. 715/753
6,836,768 B1 * 12/2004 Hirsch ............................ 707/3
2001/0042089 A1 * 11/2001 Tobin ............................. 709/1

* cited by examiner

*Primary Examiner*—Cao (Kevin) Nguyen
(74) *Attorney, Agent, or Firm*—Vedder, Price, Kaufman & Kammholz, P.C.

(57) ABSTRACT

A wireless handheld device (10) includes a display (16), a processing device (12), and memory (14) that contains instructions executable by the processing device to indicate to a user that an image (302) on a web page has a hyperlink associated with it. The processing device receives (200) a web page, such as web page source information (24) from a web browser application (18), and scans (202) the received web page to detect whether an image within the web page has a hyperlink associated therewith. If a hyperlink is detected, the processing device generates (206) text (26) for the image to indicate that the image has an associated hyperlink. The processing device displays the newly generated text on the display together with the web page to visually indicate that the image in the web page has an associated hyperlink.

10 Claims, 2 Drawing Sheets

METHOD AND APPARATUS FOR PROVIDING A HYPERLINK INDICATION ON A DISPLAY FOR AN IMAGE IN A WEB PAGE

FIELD OF THE INVENTION

The invention relates generally to handheld devices and more particularly to wireless, Internet-capable, handheld devices.

BACKGROUND OF THE INVENTION

Typical web browser applications commonly used in desktop devices and large portable devices, such as laptop computers, display web pages that may include images and text wherein certain text may be a hyperlink to another web page or web site. The text having a hyperlink is typically underlined so that a user knows that moving a mouse and clicking on the underlined text will link to another web page or uniform resource locator (URL). Images may also act as hyperlinks. For example, in a conventional web browser, when a mouse icon is focused on an image in a current web page, if there is a hyperlink associated with the image, the mouse icon changes from an arrow to a hand to indicate to the user that the image is a hyperlink.

Handheld devices, such as mobile telephones, personal digital assistants (PDAs), pagers, and wireless email devices, just to name a few, typically have fewer resources than do desktop or large portable devices to accommodate full functional web browsers. Consequently, web browser applications typically only display textual hyperlinks in a different color to indicate to a user that a particular line on a screen is a hyperlink. The colored link can then be tapped on or otherwise selected to access the link when the handheld device has a touchscreen. Hence, with handheld devices that employ touchscreens, the handheld web browser application does not typically provide any indication that an image in a web page has an associated hyperlink. As a result, a user must guess or try on a trial basis all of the images on the displayed page to access an actual hyperlink image. Therefore, commercially available handheld web browser applications fail to provide features that a handheld device user is typically accustomed to using in a desktop environment.

BRIEF DESCRIPTION OF THE DRAWINGS

The invention will be more readily understood with reference to the following drawings wherein.

DETAILED DESCRIPTION OF THE PREFERRED EMBODIMENT

Briefly, a wireless handheld device includes a display, a processing device, and memory that contains instructions executable by the processing device to indicate to a user that an image on a web page has a hyperlink associated with it. The processing device receives a web page and scans the received web page to detect whether an image within the web page has a hyperlink associated therewith. If a hyperlink is detected, the processing device generates text for the image to indicate that the image has an associated hyperlink. The processing device then displays the newly generated text on the display together with the web page, such as by superimposition, to visually indicate that the image in the web page has an associated hyperlink. Since a user can recognize from the display that a displayed image has an associated hyperlink, the user can determine whether or not to activate the hyperlink (e.g., by tapping on the newly displayed text or the image when a touchscreen display is employed by the handheld device). In a preferred embodiment, a web browser plug-in application executed by the processor device )scans a web page's hypertext markup language (HTML) source information for any embedded image uniform resource locators (URLs). If such a URL is found, the web browser plug-in application displays a text box with text, such as "click here" or other suitable text, preferably adjacent to the image that has the associated hyperlink (e.g., is itself a hyperlink as well as an image). The display of such information enables the user of a handheld device to recognize those images that are or include actual hyperlinks and to select or activate them as needed.

Figure 1:
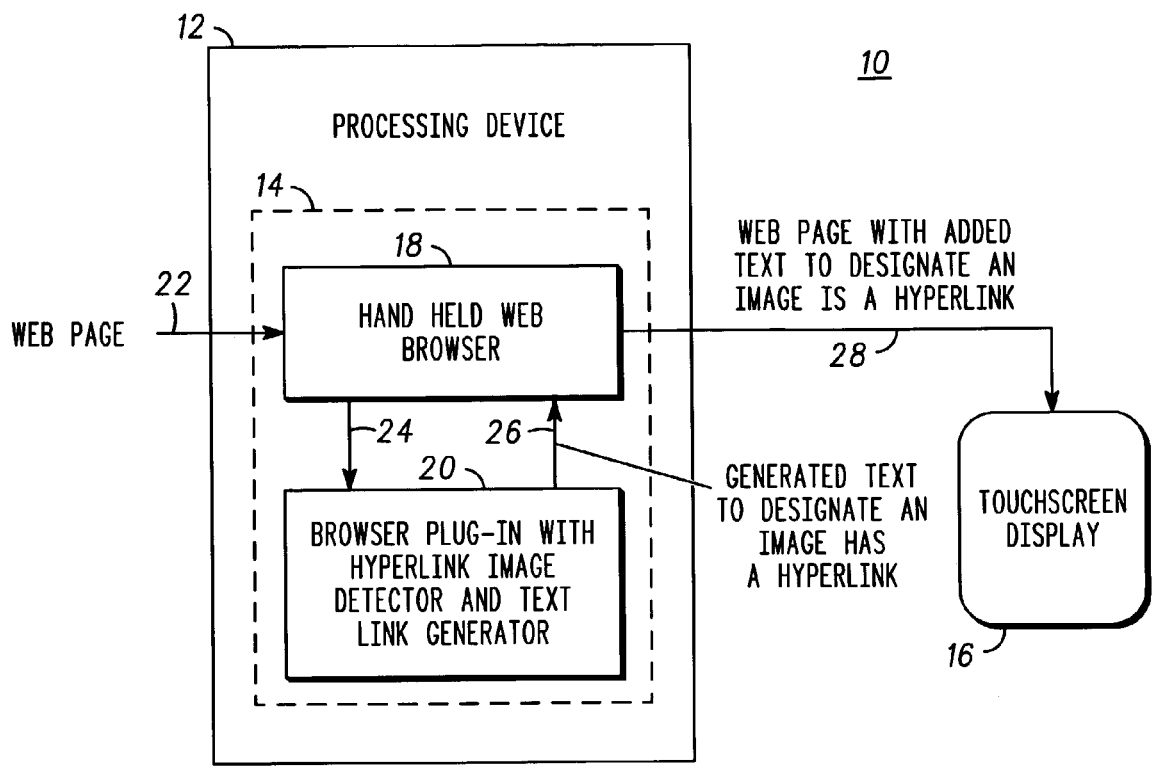
FIG. 1 is a block diagram illustrating an exemplary handheld wireless device in accordance with a preferred embodiment of the present invention.

FIG. 1 illustrates a wireless handheld device 10 in accordance with a preferred embodiment of the present invention. The wireless device 10 includes a processing device 12, a storage medium, such as memory 14, and a display 16. The processing device is operatively coupled to both the storage medium and the display 16. The wireless handheld device 10 also preferably includes suitable wireless communication circuitry (not shown) to provide optical or radio frequency (RF) wireless communication to access, for example, the Internet or another suitable source of web pages or other web information.

The processing device 12 may include one or more processors including, but not limited to, a digital signal processor (DSP), a microprocessor, a microcontroller, a state machine or any other suitable structure that executes programmable instructions stored in memory 14. Memory 14 may include any suitable memory including, but not limited to, one or more random access memory (RAM) elements, read only memory (ROM) elements, distributed memory, such as memory stored on one or more servers accessible through the Internet, local memory or any other suitable memory that stores executable instructions that, when executed by the processing device 12, causes the processing device 12 to perform the operations as described herein. In the preferred embodiment, the memory 14 includes executable instructions configured as a handheld web browser 18 and a web browser plug-in application 20. The display 16 preferably comprises a touchscreen display capable of displaying graphics and text, although any other graphics-capable display may be utilized.

The handheld web browser 18 may be a conventional handheld web browser that does not provide an indication of whether an image on a web page has an associated hyperlink. As used herein, a web page may be any suitable data structure, including, but not limited to, information in HTML format, extended markup language (XML) format, or any other suitable markup language format.

Figure 2:
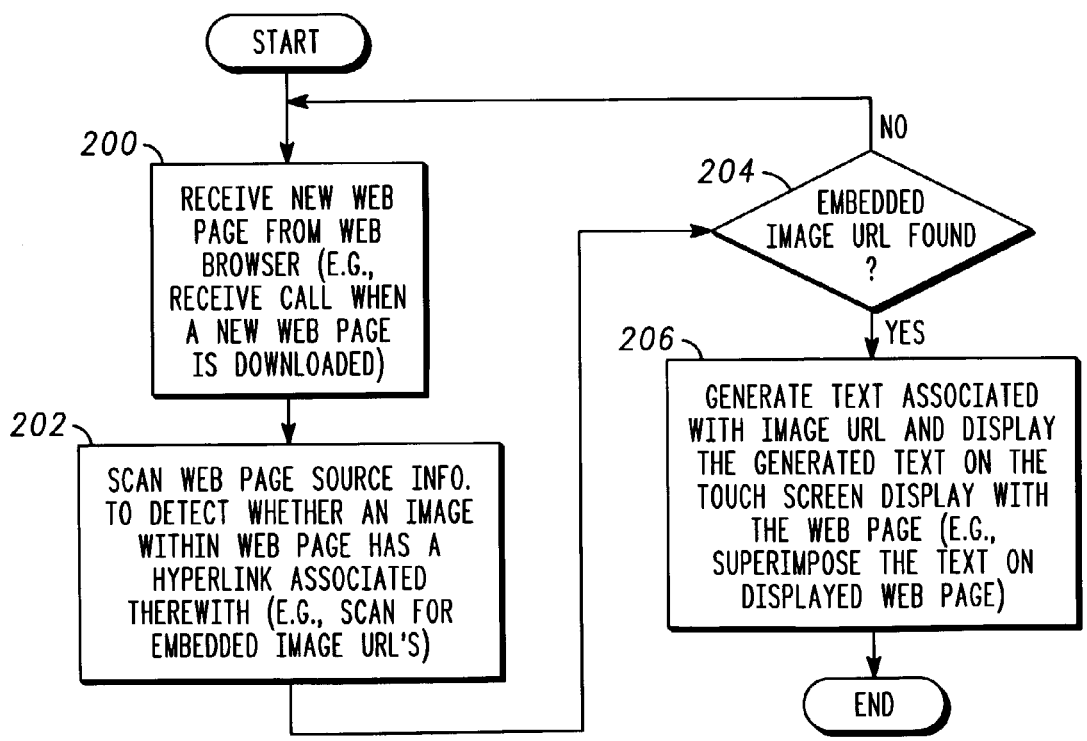
FIG. 2 is a flowchart of steps executed by a handheld wireless device to provide a hyperlink indication on a display for an image in a web page in accordance with a preferred embodiment of the present invention.

Referring now to FIG. 2, in operation, a user may use the handheld web browser 18 to obtain a web page 22 from the Internet or from a local cache or any other suitable web page source via the display 16 or some other conventional user interface. If the web page 22 is a new web page, the handheld web browser 18 calls the web browser application plug-in 20. As shown in block 200, the web browser plug-in application executed by the processing device 12) receives the new web page from the web browser application 18 as web page source information 24. As shown in block 202, the web browser plug-in application 20 causes the processing device 12 to scan the web page source information 24 to detect whether an image within the web page 22 has a hyperlink associated with it. For example, the web browser plug-in application 20 scans the web page source information 24 for embedded image URLs or other hyperlink identification data associated with an image. As shown in block 204, if an embedded image and hence a image hyperlink is found in the web page 22, the logic flow proceeds to block 206 wherein the web browser plug-in application 20 generates text 26, such as the words "click here" or other suitable text, to indicate that the image has an associated hyperlink. The web browser plug-in application 20 adds the generated text to the web page and passes the updated web page to the handheld web browser 18, such that the web page includes additional text to indicate that an image has an associated hyperlink. The handheld web browser 14 displays the generated text on the display 16 together with the original web page 22 to visually indicate that the image in the web page has a hyperlink. The generated text embedded within or otherwise accompanying the web page 22 is shown as web page information 28 in FIG. 1. As such, in addition to the image being displayed on the display 16, additional text is placed in the web page so that when a user sees the text, the user knows that the image should be tapped on or otherwise selected to activate the hyperlink associated with that image. The display of the generated text may be better understood with reference to FIG. 3.

Figure 3:
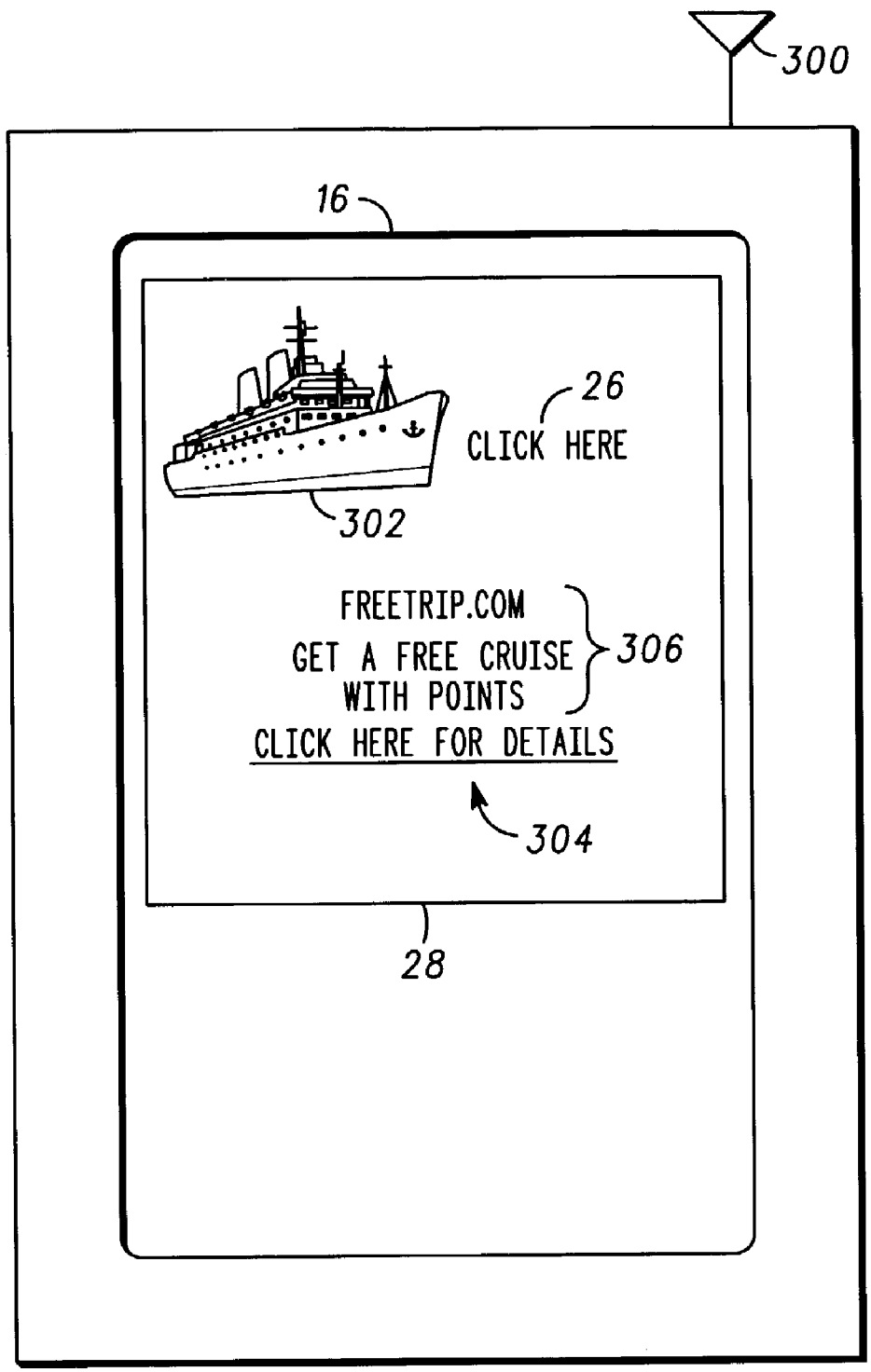
FIG. 3 is a graphical representation of a wireless handheld device in accordance with one embodiment of the present invention.

FIG. 3 is a graphical illustration of a wireless handheld device 10 capable of receiving, processing, and displaying an image 302 retrieved from the Internet or other suitable web page source. As shown, the display 16 (preferably a touchscreen display) displays the updated web page 28 containing the generated text 26, which in this embodiment is located adjacent to the image 302, to show that there is a hyperlink associated with the image 302. Clicking on or otherwise selecting the image 302 or the generated text 26, or alternatively performing an operation specified in the text 26 (e.g., depressing a key or combination of keys), initiates a hyperlink to another web page. FIG. 3 also shows conventional hyperlink text 304 that has been underlined by the handheld web browser 18 in a conventional manner. FIG. 3 further shows, for purposes of illustration, additional text 306 that was part of the original web page 22.

As noted above, the handheld web browser 18 preferably calls the web browser plug-in application 20 in response to receiving a new web page 22. The web browser plug-in application 20 then begins scanning the received new web page to detect whether an image 302 within the web page 22 has a hyperlink associated therewith. If a hyperlink is detected, such as by URLs embedded in the web page source associated with the image 302, additional text 26 is generated and displayed on a display 16 so that a user knows to tap on or otherwise select the image 302 or the generated text 26 to activate the hyperlink. The web browser plug-in application 20 is called when a new web page is downloaded from a web server and the web browser plug-in application 20 scans the web page's HTML source information for any embedded image URLs. If an embedded image URL is found, the web browser plug-in application 20 causes a text box or other suitable information to be displayed, for example, at a bottom right corner of the image 302 or otherwise adjacent to the image 302 that includes the hyperlink. The display of such text 26 allows the user to recognize those images 302 that are displayed as part of a web page and have associated hyperlinks, so that the user may activate the hyperlinks or access the hyperlink information. Other advantages will be recognized by those of ordinary skill in art.

It should be understood that the implementation of other variations and modifications of the invention and its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A wireless handheld device comprising:
a display;
a processing device operatively coupled to the display; and
memory, operatively coupled to the processing device, containing executable instructions that, when executed by the processing device, causes the processing device to:
receive a web page;
scan the received web page to detect whether an image within the web page has a hyperlink associated therewith;
generate non-hvperlink text to indicate that the image has an associated hyperlink in the event that a hyperlink is detected;
display the generated non-hyperlink text on the display together with the web page to visually indicate that the image in the web page has an associated hyperlink; and
to display the generated non-hyperlink text on the display adjacent to the image.

2. The handheld wireless device of claim 1, wherein the executable instructions are configured as a web browser plug-in application.

3. The handheld wireless device of claim 2, wherein the memory includes executable instructions that are further configured as a web browser application and wherein the web browser application calls the web browser plug-in application in response to receiving the web page.

4. The handheld wireless device of claim 1, wherein the display is a touchscreen display.

5. The wireless handheld device of claim 1, wherein the displayed image when selected, activates a hyperlink.

6. A method for providing a hyperlink indication on a display for an image in a web page, the method comprising:
receiving a web page;
scanning the received web page to detect whether an image within the web page has a hyperlink associated therewith;
in the event that a hyperlink is detected for the image, generating non-hyperlink text to indicate that the image has an associated hyperlink;
displaying the generated non-hyperlink text on the display together with the web page to visually indicate that the image in the web page has an associated hyperlink; and
displaying the generated non-hyperlink text on the display adjacent to the image.

7. The method of claim 6, wherein receiving a web page comprises receiving a call from a web browser application to begin scanning the web page.

8. A storage medium comprising:
executable instructions that, when executed by a processing device, causes the processing device to:
- receive a web page;
- scan the received web page to detect whether an image within the web page has a hyperlink associated therewith;
- generate non-hyperlink text to indicate that the image has an associated hyperlink in the event that a hyperlink is detected;
- display the generated non-hyperlink text on a display together with the web page to visually indicate that the image in the web page has an associated hyperlink; and
- display the generated non-hyperlink text on the display adjacent to the image.

9. The storage medium of claim 8, wherein the executable instructions are configured at least in part as a web browser plug-in application.

10. The storage medium of claim 9, wherein the executable instructions are further configured as a web browser application and wherein the web browser application calls the web browser plug-in application in response to receiving the web page.

* * * * *